United States Patent
Liu et al.

(10) Patent No.: US 10,849,008 B2
(45) Date of Patent: Nov. 24, 2020

(54) PROCESSING METHOD AND DEVICE FOR RADIO BEARER FOR TRANSMITTING DATA STREAM

(71) Applicant: China Academy of Telecommunications Technology, Beijing (CN)

(72) Inventors: Jiamin Liu, Beijing (CN); Bin Jiao, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 11 days.

(21) Appl. No.: 16/319,713

(22) PCT Filed: Jul. 21, 2017

(86) PCT No.: PCT/CN2017/093942
§ 371 (c)(1),
(2) Date: Jan. 22, 2019

(87) PCT Pub. No.: WO2018/014876
PCT Pub. Date: Jan. 25, 2018

(65) Prior Publication Data
US 2019/0253918 A1 Aug. 15, 2019

(30) Foreign Application Priority Data
Jul. 22, 2016 (CN) .......................... 2016 1 0589413

(51) Int. Cl.
*H04W 28/02* (2009.01)
*H04W 76/15* (2018.01)
(Continued)

(52) U.S. Cl.
CPC ....... *H04W 28/0268* (2013.01); *H04W 24/10* (2013.01); *H04W 28/18* (2013.01);
(Continued)

(58) Field of Classification Search
CPC ............. H04W 28/0268; H04W 76/15; H04W 72/085; H04W 48/20; H04W 48/16;
(Continued)

(56) References Cited

U.S. PATENT DOCUMENTS

| 2015/0003308 A1* | 1/2015 | Jin ........................ H04W 68/02 370/310 |
| 2015/0264706 A1* | 9/2015 | Voigt ................ H04W 72/1263 370/329 |

(Continued)

FOREIGN PATENT DOCUMENTS

| CN | 101651894 A | 2/2010 |
| CN | 102291763 A | 12/2011 |

(Continued)

OTHER PUBLICATIONS

ZTE Corporation, CATR, "New QoS Architecture," SA WG2 Meeting #114, S2-161755, Sophia Antipolis, France, Apr. 11-15, 2016.

(Continued)

*Primary Examiner* — Kiet Tang
(74) *Attorney, Agent, or Firm* — Foley & Lardner LLP

(57) ABSTRACT

Disclosed are a processing method and device for a radio bearer for transmitting a data stream. The method comprises: determining a quality of service parameter transferred to an access network node by a control entity of a core network; and performing processing on a radio bearer according to the quality of service parameter so as to transmit a data stream needing to be transmitted between the core network and a UE unit. Processing is performed on the radio bearer at the UE unit according to a requirement of the access network node. The radio bearer may transmit the data stream between the core network and the UE unit. The solution herein can solve the problem of mapping multiple data streams having the same service quality to a radio bearer, reduce complexity (Continued)

of a signaling process, ensure quality of service transmission, ensure quality of service transmission, and support processing of a special packet.

16 Claims, 5 Drawing Sheets

(51) Int. Cl.
  *H04W 24/10* (2009.01)
  *H04W 28/18* (2009.01)
  *H04W 40/06* (2009.01)
  *H04W 40/12* (2009.01)
  *H04W 40/20* (2009.01)
  *H04W 48/16* (2009.01)
  *H04W 48/20* (2009.01)
  *H04W 72/08* (2009.01)
  *H04W 76/38* (2018.01)
  *H04W 76/20* (2018.01)

(52) U.S. Cl.
  CPC ............ *H04W 40/06* (2013.01); *H04W 40/12* (2013.01); *H04W 40/20* (2013.01); *H04W 48/16* (2013.01); *H04W 48/20* (2013.01); *H04W 72/085* (2013.01); *H04W 76/15* (2018.02); *H04W 76/20* (2018.02); *H04W 76/38* (2018.02)

(58) Field of Classification Search
  CPC ..... H04W 40/20; H04W 40/12; H04W 40/06; H04W 28/18; H04W 24/10; H04W 76/20; H04W 76/38; H04W 28/10; H04W 28/0257; H04W 76/27
  See application file for complete search history.

(56) References Cited

U.S. PATENT DOCUMENTS

2017/0048922 A1\* 2/2017 Lee ................. H04W 76/38
2019/0159072 A1\* 5/2019 Zhu ................. H04W 28/24

FOREIGN PATENT DOCUMENTS

| CN | 102612096 A | 7/2012 |
| CN | 103404102 A | 11/2013 |
| CN | 103905378 A | 7/2014 |
| CN | 104486793 A | 4/2015 |
| CN | 104683955 A | 6/2015 |
| WO | WO-2014/058369 A1 | 4/2014 |
| WO | WO 2015108291 A1 | 7/2015 |

OTHER PUBLICATIONS

ZTE, "Discussion on the QoS control in the NextGen RAN," GPP TSG-RAN WG3 Meeting #91 bis, R3-160818, Bangalore, India, Apr. 11-15, 2016.

ZTE, "Further discussion on the RAN QoS control," 3GPP TSG-RAN WG2 Meeting #94, R2-163746,China, May 23-27, 2016.

ZTE, "QoS handling for PCS-based V2V transmission," 3GPP TSG-RAN WG2 Meeting #94, R2-163819, Nanjing, China, May 23-27, 2016.

Huawei, HiSilicon, "Considerations on 5G RAN QoS framework," 3GPP TSG-RAN2 Meeting #94, R2-164267, Nanjing, China, May 23-27, 2016.

\* cited by examiner

PROCESSING METHOD AND DEVICE FOR RADIO BEARER FOR TRANSMITTING DATA STREAM

This application is a National Stage of International Application No. PCT/CN2017/093942, filed Jul. 21, 2017, which claims the priority of Chinese Patent Application No. 201610589413.7, filed with the Chinese Patent Office on Jul. 22, 2016, and entitled "A method and apparatus for processing a radio bearer for transmitting a data flow", both of which are hereby incorporated by reference in their entireties.

FIELD

The present invention relates to the field of wireless communications, and particularly to a method and apparatus for processing a radio bearer for transmitting a data flow.

BACKGROUND

FIG. 1 is a schematic diagram of a model of bearers in the existing Long Term Evolution (LTE) system. As illustrated, the bearers in the existing LTE system are mapped to each other at a plurality of layers in that an Evolved Packet System (EPS) bearer is mapped to an Evolved Universal Terrestrial Radio Access Network (E-UTRAN) Radio Access Bearer (RAB) in a one-to-one manner, and an access network E-RAB is also mapped to an air interface radio bearer in a one-to-one manner.

In the existing LTE system, each EPS bearer can only be mapped to one air interface radio bearer on an air interface, and a separate tunnel is set up for each EPS bearer on an S1-U interface, so when they are mapped to each other in a one-to-one manner, they can be configured simply, but also a data packet can be transmitted simply, in a one-to-one channel mechanism. However in a 5G system, a data flow transmitted from a core network to the Radio Access Network (RAN) side is not mapped to an RAN-side bearer in a one-to-one manner any longer, and a finer data flow may be transmitted from the core network, so the RAN side needs to decide on its bearer mapping pattern, and to perform a configuration procedure, so that data can be subsequently transmitted correctly, and a quality of service can be guaranteed.

A drawback in the prior art lies in that there has been absent so far a solution to mapping to an RAN-side bearer when a data flow is not mapped to an RAN-side bearer in a one-to-one manner any longer.

SUMMARY

Embodiments of the invention provide a method and apparatus for processing a radio bearer for transmitting a data flow so as to address the problem of the absence of a solution to mapping to an RAN-side bearer.

In a first aspect, an embodiment of the invention provides a method for processing a radio bearer for transmitting a data flow, the method including: determining a quality of service parameter passed by a core network control entity to an access network node; and processing a radio bearer according to the quality of service parameter to transmit a data flow to be transmitted between a core network and a UE.

Optionally, the quality of service parameter is passed to the access network node in a signaling-plane message; or the quality of service parameter is passed to the access network node by carrying the quality of service parameter in a data packet transmitted, to the access network node.

Optionally, processing the radio bearer according to the quality of service parameter when the quality of service parameter is passed to the access network node in the signaling-plane message includes: searching existing radio bearers between an access network and the UE for a radio bearer satisfying the quality of service parameter requirement, and after the radio bearer satisfying the quality of service parameter requirement is found as a result of the search, transmitting the data flow to be transmitted by the core network control entity to the UE, on the radio bearer; or searching existing radio bearers between an access network and the UE for a radio bearer satisfying the quality of service parameter requirement, and after no radio bearer satisfying the quality of service parameter requirement is found as a result of the search, determining whether a radio bearer satisfying the quality of service parameter requirement can be set up, according to a resource of the access network, and if so, setting up a radio bearer satisfying the quality of service parameter requirement, and transmitting the data flow to be transmitted by the core network control entity to the UE, on the set radio bearer; or searching existing radio bearers between an access network and the UE for radio bearers satisfying the quality of service parameter requirement, and reconfiguring some radio bearer among the radio bearers which can satisfy the quality of service parameter requirement, in a radio bearer reconfiguration flow to satisfy the quality of service parameter requirement, and transmitting the data flow to be transmitted by the core network control entity to the UE, on the radio bearer.

Optionally, determining whether a radio bearer satisfying the quality of service parameter can be set up, according to the resource of the access network includes determining whether a radio bearer satisfying the quality of service parameter requirement can be set up, according to whether the resource of the access network can satisfy a bit rate requirement for the data flow.

Optionally, the quality of service parameter includes one or a combination of the following information: a quality of service requirement for the data flow, a transmission attribute of the data flow, and a characteristic of a special data packet.

Optionally, the quality of service parameter includes the characteristic of a special data packet, the method further includes: identifying a data packet in the data flow according to the characteristic of a special data packet, and/or a data packet processing rule preset on the access network node, and processing the identified data packet according to a requirement on the data packet.

Optionally, processing the radio bearer according to the quality of service parameter when the quality of service parameter is passed to the access network node by carried the quality of service parameter in the data packet to be transmitted to the access network node, includes: searching existing radio bearers between an access network and the UE for a radio bearer satisfying the quality of service parameter requirement, and after the radio bearer satisfying the quality of service parameter requirement is found as a result of the search, transmitting the data packet transmitted by the core network control entity, to the UE on the found radio bearer; or searching existing radio bearers between an access network and the UE for a radio bearer satisfying the quality of service parameter requirement, and after no radio bearer satisfying the quality of service parameter requirement is found as a result of the search, setting up a radio bearer satisfying the quality of service parameter requirement, and transmitting the data packet transmitted by the core network control entity, to the UE on the set radio bearer.

Optionally, setting up the radio bearer, and transmitting the data packet transmitted by the core network control entity, to the UE on the radio bearer includes: setting up a new radio bearer, configuring various L1 and L2 options for the new radio bearer according to the quality of service parameter requirement, and transmitting the data packet transmitted by the core network control entity, to the UE on the radio bearer after the radio bearer is configured.

Optionally, the method further includes: releasing a set radio bearer according to a set timer; and/or releasing a set radio bearer upon reception of such a notification of the core network control entity that transmission of a data flow ends.

Optionally, when the data flow to be transmitted between the core network and the UE includes an uplink data flow, the method further includes: when an uplink radio bearer for transmitting uplink data is set up or reconfigured, notifying, by the access network node, the UE of related parameters of the uplink radio bearer, and a mapping relationship between the uplink data flow and the uplink radio bearer.

In a second aspect an embodiment of the invention provides a method for processing a radio bearer for transmitting a data flow, the method including:

processing a radio bearer on a UE according to a requirement of an access network node, wherein the requirement of the access network node is made by the access network node according to a quality of service parameter passed by a core network control entity to the access network node; and transmitting a data flow to be transmitted between a core network and the UE, on the radio bearer.

Optionally, when the data flow to be transmitted between the core network and the UE includes an uplink data flow, the method further includes: determining an uplink data flow to be transmitted by the UE, and notifying the core network control entity.

Optionally, the method further includes: receiving a notification including respective related parameters of an uplink radio bearer for transmitting an uplink data flow, and a mapping relationship between the uplink data flow and the uplink radio bearer.

In a third aspect, an embodiment of the invention provides an apparatus for processing a radio bearer for transmitting a data flow, the apparatus including: a determining module configured to determine a quality of service parameter passed by a core network control entity to an access network node; and a processing module to process a radio bearer according to the quality of service parameter to transmit a data flow to be transmitted between a core network and a UE.

Optionally, the determining module is further configured to determine the quality of service parameter according to the quality of service parameter passed by the core network control entity to the access network node in a signaling-plane message; or to determine the quality of service parameter according to the quality of service parameter carried in a data packet transmitted to the access network node.

Optionally, when the quality of service parameter is passed to the access network node in the signaling-plane message, the processing module is further configured: to search existing radio bearers between an access network and the UE for a radio bearer satisfying the quality of service parameter requirement, and after the radio bearer satisfying the quality of service parameter requirement is found as a result of the search, to transmit the data flow to be transmitted by the core network control entity to the UE, on the radio bearer; or to search existing radio bearers between an access network and the UE for a radio bearer satisfying the quality of service parameter requirement, and after no radio bearer satisfying the quality of service parameter is found as a result of the search, to determine whether a radio bearer satisfying the quality of service parameter can be set up, according to a resource of the access network, and if so, to set up a radio bearer satisfying the quality of service parameter requirement, and to transmit the data flow to be transmitted by the core network control entity to the UE, on the set radio bearer; or to search existing radio bearers between an access network and the UE for radio bearers satisfying the quality of service parameter requirement, and to reconfigure some radio bearer among the radio bearers which can satisfy the quality of service parameter requirement, in a radio bearer reconfiguration flow to satisfy the quality of service parameter requirement, and transmit the data flow to be transmitted by the core network control entity to the UE, on the radio bearer.

Optionally, the processing module is configured to determine whether a radio bearer satisfying the quality of service parameter requirement can be set up, according to the resource of the access network by determining whether a radio bearer satisfying the quality of service parameter can be set up, according to whether the resource of the access network can satisfy a bit rate requirement for the data flow.

Optionally, the quality of service parameter includes one or a combination of the following information: a quality of service requirement for the data flow, a transmission attribute of the data flow, and a characteristic of a special data packet.

Optionally, the processing module is further configured, when the quality of service parameter includes the characteristic of a special data packet, to identify a data packet in the data flow according to the characteristic of a special data packet, and/or a data packet processing rule preset on the access network node, and to process the identified data packet according to a requirement on the data packet.

Optionally, when the quality of service parameter is carried in the data packet to be transmitted to the access network node, and passed to the access network node, the processing module is further configured: to search existing radio bearers between an access network and the UE for a radio bearer satisfying the quality of service parameter requirement, and after the radio bearer satisfying the quality of service parameter requirement is found as a result of the search, to transmit the data packet transmitted by the core network control entity, to the UE on the found radio bearer; or to search existing radio bearers between an access network and the UE for a radio bearer satisfying the quality of service parameter requirement, and after no radio bearer satisfying the quality of service parameter requirement is found as a result of the search, to set up a radio bearer satisfying the quality of service parameter requirement, and to transmit the data packet transmitted by the core network control entity, to the UE on the set radio bearer.

Optionally, the processing module is configured to set up the radio bearer, and to transmit the data packet transmitted by the core network control entity, to the UE on the radio bearer by: setting up a new radio bearer, to configure various L1 and L2 options for the new radio bearer according to the quality of service parameter requirement, and transmitting the data packet transmitted by the core network control entity, to the UE on the radio bearer after the radio bearer is configured.

Optionally, the processing module is further configured: to release a set radio bearer according to a set timer; and/or release a set radio bearer upon reception of a notification of the core network control entity notifying that transmission of a data flow is finished.

Optionally, the processing module is configured to set up an uplink radio bearer for transmitting uplink data when the data flow to be transmitted between the core network and the UE includes an uplink data flow by notifying the UE of related parameters of the uplink radio bearer, and a mapping relationship between the uplink data flow and the uplink radio bearer.

In a fourth aspect, an embodiment of the invention provides an apparatus for processing a radio bearer for transmitting a data flow, the apparatus including: a UE processing module configured to process a radio bearer on a UE according to a requirement of an access network node, wherein the requirement of the access network node is made by the access network node according to a quality of service parameter passed by a core network control entity to the access network node; and a transmitting module configured to transmit a data flow to be transmitted between a core network and the UE, on the radio bearer.

Optionally, the UE processing module is further configured to determine an uplink data flow to be transmitted by the UE, and to notify the core network control entity, when the data flow to be transmitted between the core network and the UE includes an uplink data flow.

Optionally, the UE processing module is further configured to receive a notification including respective related parameters of an uplink radio bearer for transmitting an uplink data flow, and a mapping relationship between the uplink data flow and the uplink radio bearer.

In a fifth aspect, an embodiment of the invention provides an access network node device including: a processor, a memory, and a transceiver, wherein the transceiver is configured to receive and transmit data under the control of the processor, preset program is stored in the memory, and the processor is configured to read the program in the memory, and to perform the method according to any one of the embodiments in the first aspect.

In a sixth aspect, an embodiment of the invention provides a user equipment including: a processor, a memory, and a transceiver, wherein the transceiver is configured to receive and transmit data under the control of the processor, preset program is stored in the memory, and the processor is configured to read the program in the memory, and to perform the method according to any one of the embodiments in the second aspect.

In a seventh aspect, an embodiment of the invention provides a computer storage medium storing computer executable instructions configured to enable the computer to perform the method according to any one of the embodiments in the first aspect.

In an eighth aspect, an embodiment of the invention provides a computer storage medium storing computer executable instructions configured to enable the computer to perform the method according to any one of the embodiments in the second aspect.

In the technical solutions according to the embodiments of the invention, when there is a data flow to be transmitted between the core network and the UE, the core network passes the quality of service parameters to the access network node, and the access network node processes a radio bearer according to the quality of service parameters to transmit the data flow to be transmitted between the core network and the UE. The radio bearer can be set up or modified according to the real quality of service of the data flow, so with these solutions, a plurality of data flows with the same quality of service can be mapped in effect onto a radio bearer to thereby lower the complexity of a signaling procedure, guarantee the quality of traffic transmission, and support processing of a special data packet.

BRIEF DESCRIPTION OF THE DRAWINGS

The drawings described here are intended to provide further understanding of the invention, and constitute a part of the invention, and the exemplary embodiments of the invention, and the description thereof are intended to set forth the invention, but not to limit the invention unduly.

DETAILED DESCRIPTION OF THE EMBODIMENTS

Figure 1:
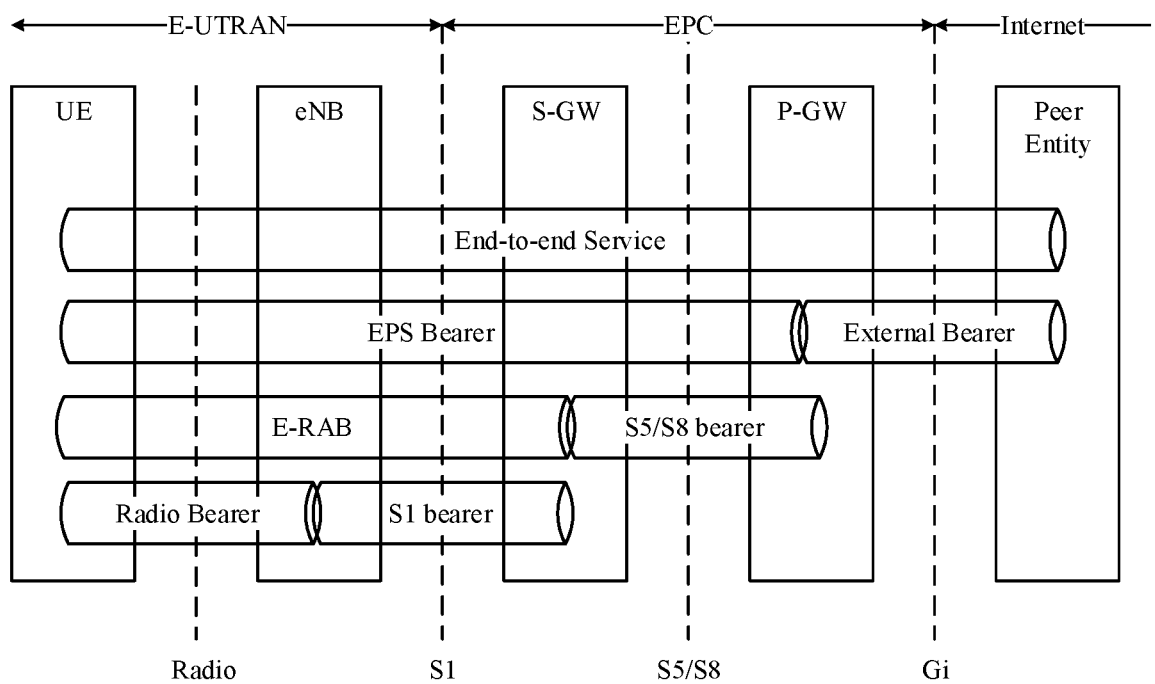
FIG. 1 is a schematic diagram of the model of bearers in the existing LTE system.

In the existing system, an EPS bearer of a core network is mapped to a radio bearer of an access network in a one-to-one manner, and the access network configures a radio bearer of an air interface according to bearer configuration information in an S1 message. In a 5G system, a more flexible data flow managing mechanism is desirable to the existing core network, and this means that the simple one-to-one mapping relationship between data of the core network, and an access network bearer is not satisfactory any longer. In the embodiments of the invention, there is provided a solution to setting up and maintaining a radio bearer by an access network in a new architecture so as to accommodate a flexible data flow mechanism of the core network, to guarantee a quality of service, and to improve the system efficiency and a user experience. Particular embodiments of the invention will be described below with reference to the drawings.

In the technical solutions according to the embodiments of the invention, a core network control entity configures an access network node with a data attribute of a core network in a signaling procedure, the access network node decides on mapping of core network data to radio bearers, and sets up and maintains the radio bearers, and the access network node manages and configures uplink and downlink radio bearers.

Here the core network control entity refers to an entity, responsible for core network related control functions, in a 5G system, e.g., similar to a Mobility Management Entity (MME) in an LTE system, etc.

The access network node refers to an entity, responsible for control functions, at the access network side in the 5G system, and can be a distributed access node, e.g., similar to an eNB node in the LTE system, or can be a centralized access network central control node.

In order to transmit downlink data, for a newly emerging session data flow, before data are transmitted, firstly the signaling procedure can be performed so that the core network control entity configures the access network control entity with an QoS attribute of the data flow, and then the access network control entity determines whether there is an appropriate Data Radio Bearer (DRB), according to the QoS attribute, and if not, then it will set up a new DRB, and instruct an access network user-plane entity (generally the access network control entity is the same as the access network user-plane entity, e.g., an eNB) to transmit the data flow on the new DRB.

In order to transmit uplink data, a User Equipment (UE) firstly interacts with the core network control entity about an uplink data flow to be transmitted, the core network control entity decides on its QoS attribute, and the core network control entity needs to configure both the access network control entity and the UE with the uplink QoS attribute; and thereafter the access network control entity determines whether there is an appropriate DRB, according to the QoS attribute, and if not, it will set up a new DRB, and instruct the UE to transmit the data flow on the new DRB. The DRB setting-up procedure above is a procedure between the access network node and the UE.

When core network entities are involved in an implementation, generally a core network control entity manages control-plane procedures of the core networks, and is involved in all the signaling related procedures, and a core network user-plane entity is a node transmitting data, so all the data are transmitted from the core network user-plane entity. When access network nodes are involved, generally an access network control node and an access network user-plane node are the same node, e.g., an eNB, and from the operational and logical perspectives, the control node performs a signaling procedure, and the user-plane node transmits data. In order to better describe the technical solutions according to the embodiments of the invention, both an implementation in which they are the same node, and an implementation in which there are separate from each other will be described in the embodiments.

In the following description, implementations at the core network control entity side, the access network node side, and the UE side will be described respectively, and then an implementation in which the three parties cooperate with each other will be further exemplified for better understanding of the implementations of the solutions according to the embodiments of the invention, but this description shall not suggest that the three parties must cooperate with each other in an implementation, or operate separately in an implementation. In fact, when the core network control entity side, the access network node side, and the UE side operate separately from each other, they can also address the respective problems at the core network control entity side, the access network node side, and the UE side, although a better technical effect can be achieved when the three parties operate in cooperation.

In the following description, transmission of uplink data of a UE to a core network, and downlink data of the core network to the UE will be described respectively, and their particular implementations will be described by way of an example. Particularly the downlink implementation will be described in the following first, second, third, and fourth embodiments, and the uplink implementation will be described in the following fifth embodiment.

Figure 2:
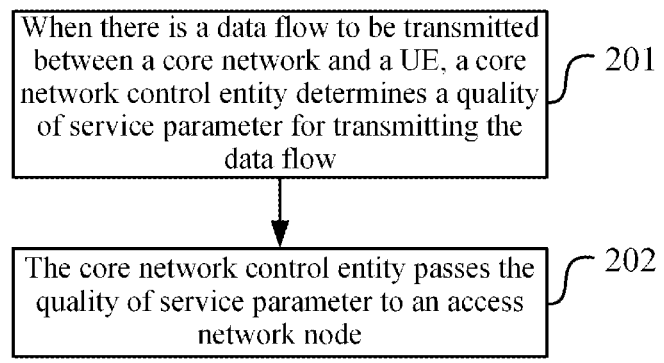
FIG. 2 is a schematic flow chart of a method for processing a radio bearer for transmitting a data flow at the core network control entity side according to an embodiment of the invention.

FIG. 2 is a schematic flow chart of a method for processing a radio bearer for transmitting a data flow at the core network control entity side according to an embodiment of the invention, and as illustrated, the method can include the following steps:

in the step 201, when there is a data flow to be transmitted between a core network and a UE, a core network control entity determines a quality of service parameter for transmitting the data flow; and in the step 202, the core network control entity passes the quality of service parameter to an access network node.

Figure 3:
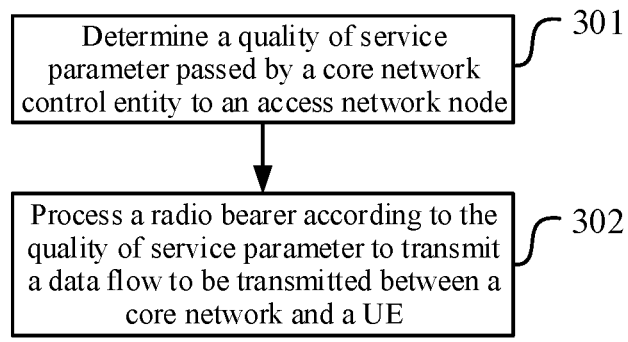
FIG. 3 is a schematic flow chart of a method for processing a radio bearer for transmitting a data flow at the access network node side according to an embodiment of the invention.

FIG. 3 is a schematic flow chart of a method for processing a radio bearer for transmitting a data flow at the access network node side according to an embodiment of the invention, and as illustrated, the method can include the following steps:

the step 301 is to determine a quality of service parameter passed by a core network control entity to an access network node; and the step 302 is to process a radio bearer according to the quality of service parameter to transmit a data flow to be transmitted between a core network and a UE.

In an implementation, the quality of service parameter can be passed to the access network node by passing the quality of service parameter to the access network node in a Set Bearer message, and a further particular implementation thereof will be described in the following first embodiment.

Alternatively the quality of service parameter can be passed to the access network node by passing the quality of service parameter to the access network node after carrying the quality of service parameter in a data packet to be transmitted to the access network node, and a further particular implementation thereof will be described in the following first embodiment.

In an implementation, the quality of service parameter can include one or a combination of the following information: a quality of service requirement for the data flow, a transmission attribute of the data flow, and a characteristic of a special data packet.

A further particular implementation thereof will be described in the following first embodiment.

In an implementation, when a data flow to be transmitted between the core network and the UE is an uplink data flow, the quality of service parameter is determined according to an uplink data flow transmission requirement notified by the UE to the core network control entity. A further particular implementation thereof will be described in the following fifth embodiment.

Figure 4:
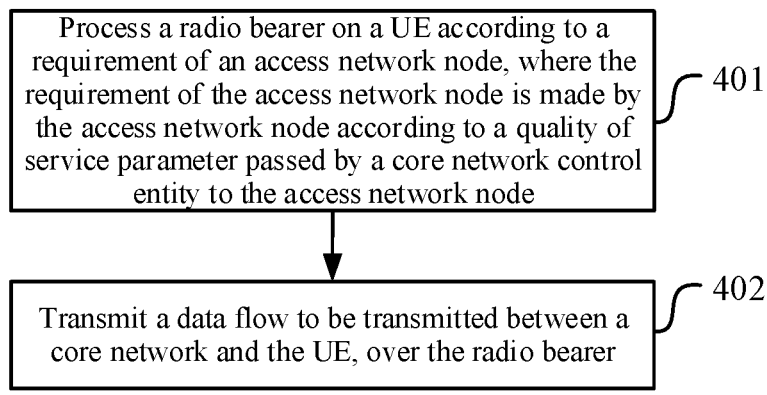
FIG. 4 is a schematic flow chart of a method for processing a radio bearer for transmitting a data flow at the UE side according to an embodiment of the invention.

FIG. 4 is a schematic flow chart of a method for processing a radio bearer for transmitting a data flow at the UE side according to an embodiment of the invention, and as illustrated, the method can include the following steps:

the step 401 is to process a radio bearer on a UE according to a requirement of an access network node, where the requirement of the access network node is made by the access network node according to a quality of service parameter passed by a core network control entity to the access network node; and the step 402 is to transmit a data flow to be transmitted between a core network and the UE, on the radio bearer.

Reference can be made to the description of the implementation of the access network node for an implementation in which the UE transmits downlink data, but in an implementation, when the data flow to be transmitted between the core network and the UE includes an uplink data flow, the method can further include: determining the uplink data flow to be transmitted by the UE, and notifies the core network control entity.

In an implementation, the core network control entity is notified of the transmission requirement via NAS signaling.

In an implementation, the method can further include: receiving a notification including respective parameters of an uplink radio bearer for transmitting the uplink data flow, and a mapping relationship between the uplink data flow and the uplink radio bearer.

A particular implementation in which the uplink data flow is transmitted will be described in the fifth embodiment.

Particular implementations thereof will be described below by way of an example.

Firstly, a flow of setting up an E-RAB, and a process of reconfiguring a Radio Resource Control (RRC) connection in the implementations will be described in brief, and reference can be made to the other technical documents for details thereof.

Figure 5:
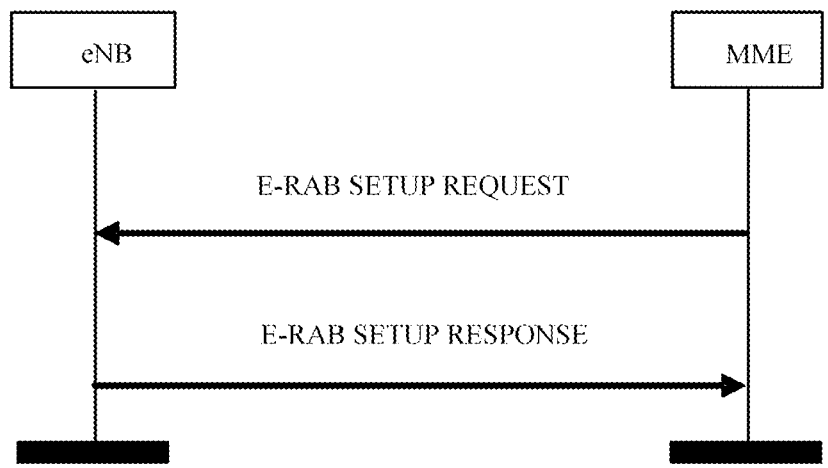
FIG. 5 is a schematic flow chart of setting up an E-RAB according to an embodiment of the invention.

FIG. 5 is a schematic flow diagram of setting up an E-RAB, and as illustrated, an MME initiates a procedure of setting up, modifying, and releasing an E-RAB to an evolved Node B (eNB) via an S1 interface, and in the procedure of setting up and modifying the E-RAB, the MME notifies the eNB of a rate parameter, a Quality of Service (QoS) parameter, etc., of the RAB so that the eNB executes an algorithm to guarantee a quality of service for the bearer.

Figure 6:
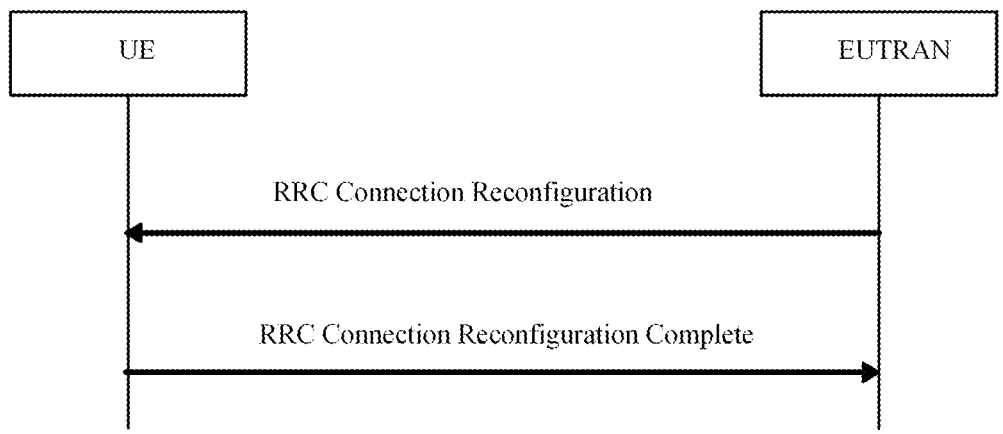
FIG. 6 is a schematic diagram of a procedure of reconfiguring an RRC connection according to an embodiment of the invention.

FIG. 6 is a schematic diagram of an RRC connection reconfiguration procedure according to an embodiment of the invention, and as illustrated, an access network generally configures a bearer by configuring a dedicated radio bearer in an RRC connection reconfiguration procedure.

First Embodiment

A procedure of setting up a radio bearer will be described in this embodiment taking downlink data as an example.

In this example, a quality of service parameter is passed to the access network node in a Bearer setup message.

In a particular implementation, when a UE has downlink data to be transmitted, typically a core network user-plane entity firstly triggers a core network control-plane entity to perform transmission-related setup procedure, possibly as follows.

1. The core network control-plane entity passes the quality of service parameter to the access network node, and the quality of service parameter can include one or a combination of the following information: a quality of service requirement for the data flow, a transmission attribute of the data flow, and a characteristic of a special data packet.

Particularly, when the core network control-plane entity detects new downlink data to be transmitted, but related transmission and configuration of the data flow has not been set up, the core network control-plane entity firstly transmits a Bearer setup message to the access network node, and the message carries:

the quality of service requirement for the data flow, where the access network node is notified of the quality of service requirement for the data flow, including a QoS parameter, a traffic priority, a rate parameter, etc., where the QoS parameter generally includes a delay characteristic and a block error ratio of data transmission, the traffic priority includes a traffic priority level, whether preemption is allowable, and a preempted attribute, and the rate parameter includes the highest traffic rate, a guaranteed bit rate, and other attributes, and also a UE aggregated ratio can be configured;

the transmission attribute of the data flow, where the access network node is notified of some transmission attributes of the data flow, and for example, if the data flow is an IP data packet, then the attributes of the data flow may be represented as an IP quintuple, e.g., a destination IP address, a destination port number, a source IP address, a source port number, and other IP header characteristics. With these characteristics, the access network node can easily identify which data belong to this data flow, and thus guarantee a configured quality of service for these data. For another data flow than an IP data flow, the access network node shall also be configured with explicit attributes of the data flow to thereby identify the data flow. Moreover a flow identifier can alternatively be carried in the data packet to distinguish the data flow. For example, a data flow is a data flow 1, and another data flow is a data flow 2; data flow identifiers are carried in data packets; and a transmission parameter and a quality of service for the data flow 1 are configured in a control-plane procedure, so that subsequently received data carrying the data flow identifier can be transmitted and processed as configured; and the characteristic of a special data packet, where the access network node can be further notified of some characteristics of a special data packet, e.g., a special identifier or symbol carried in a header or a payload of the special data packet to identify the special data packet, etc.; and a traffic level of the special data packet can be configured separately, and for example, a priority thereof can be improved. In a typical application, a high priority can be set for bonus data among WeChat data to thereby avoid congestion.

2. The core network control-plane entity receives an Acknowledge message of bearer setup from the access network node, and determines that data transmission has been configured, and data can be subsequently transmitted normally.

A corresponding implementation of the access network node will be described below.

1. When the quality of service parameter is passed to the access network node in a singling-plane message (e.g., a Bearer setup message), a radio bearer can be processed according to the quality of service parameter as follows:

existing radio bearers between the access network and the UE are searched for a radio bearer satisfying the quality of service parameter, and after the radio bearer satisfying the quality of service parameter is found as a result of the search, the data flow to be transmitted by the core network control entity to the UE is transmitted on the radio bearer; or existing radio bearers between the access network and the UE are searched for a radio bearer satisfying the quality of service parameter, and after no radio bearer satisfying the quality of service parameter is found as a result of the search, it is determined whether a radio bearer satisfying the quality of service parameter can be set up, according to a resource of the access network, and if so, then the radio bearer will be set up, and the data flow to be transmitted by the core network control entity to the UE will be transmitted on the radio bearer.

Particularly, data flow setup signaling from the core network control-plane entity is received, the quality of service requirement of the data flow, e.g., a required transmission delay, a required block error ratio, a traffic priority, etc., is obtained from the signaling, the existing radio bearers are searched for a set radio bearer satisfying the same transmission condition, according to these attributes, and if not, then a radio bearer setup procedure will be initiated, and the data flow will be admitted according to the rate attribute of the data flow; and if it is determined that transmission of the data flow can be borne, then it will be decided that the data flow is admitted successfully; and if there is no sufficient resource, then it will be decided that the data flow fails to be admitted.

For the admission decision, it is determined whether a radio bearer satisfying the quality of service parameter requirement can be set up, according to the resource of the access network, and this can be determined according to whether the resources of the access network can satisfy the bit rate requirement for the data flow.

Particularly, in the admission procedure, it is generally determined whether the radio resource of the access network can satisfy the rate requirement of the traffic. Generally the guaranteed bit rate shall be guaranteed on some reserved resource, and the access network node can decide whether to admit the data flow, according to the guaranteed bit rate requirement, and an occupancy condition of the resource. Moreover even traffic without any guaranteed bit rate requirement, e.g., best-effort traffic, still requires some basic rate, and whether to admit the data flow can be decided according to the basic rate. If the data flow is allowed by the resource, then it will be decided that the data flow is admitted successfully; otherwise, it will be decided that the data flow fails to be admitted.

The access network node determines whether there is an existing radio bearer corresponding to a newly created data flow, generally as follows: if there is not any dedicated radio bearer on the air interface, then a new radio bearer will be set up for transmitting the newly created data flow via the air interface; and if there are some existing dedicated radio bearers on the air interface then all the existing radio bearers will be traversed, qualities of services on the radio bearers will be compared with a quality of service for the newly created data flow, and if the quality of service of one of the radio bearers is the same as that of the data flow, then the data flow may be mapped onto the radio bearer; and if none of the qualities of services on the radio bearers is the same as that of the data flow, then a new radio bearer will be set up.

Whether the qualities of services are the same is generally determined in such a way that the qualities of services are the same only if all of delay requirements, block error rates, priorities, and other parameters are equal; and for example, both of the longest transmission delay requirements are 300 ms, both of block error rate requirements are 10-6, and both of transmission priorities are the same, so the qualities of services are the same, and they can be multiplexed onto a radio bearer.

Moreover, in some implementation, approximate qualities of services can also be mapped onto a radio bearer; and for example, when both of delay requirements are 300 ms, and a block error requirement of an existing DRB is 10-6, whereas a block error requirement of newly created traffic is 10-5, so the newly created data flow can also be mapped onto the existing DRB. If there are approximate delays or priorities, then such mapping may be made particularly dependent upon an algorithm.

In an implementation, the radio bearer can be set up as follows: after the radio bearer is set up with the UE according to the quality of service parameter requirement, a message, acknowledging that the bearer is set up, which responds to the signaling-plane message, an Acknowledge message of bearer setup, is returned to the core network.

Particularly, when the access network node does not find any radio bearer corresponding to the newly created data flow among the existing radio bearers thereof, and decides to set up a new radio bearer for the data flow, the access network node initiates an air interface radio bearer setup procedure, possibly as follows:

the access network node transmits a Radio bearer setup message to the UE, and the message carries a bearer ID, and also a transmission configuration corresponding to the quality of service of the data flow to be borne, e.g., a layer-2 transmission mode including an Acknowledged Mode (AM) or an Unacknowledged Mode (UM), the largest number of times that an Automatic Repeat Request (ARQ) or a Hybrid Automatic Repeat Request (HARQ), a corresponding priority of the bearer, etc. The UE sets up the radio bearer according to the configuration, and thereafter feeds back completion signaling to the network.

2. After the data flow is admitted successfully, and the radio bearer is set up successfully, the access network node returns an Acknowledge message to the core network control entity, and subsequently transmits data according to the configuration.

In an implementation, if the core network node is separate from the access network user-plane node, then the core network node may further notify the access network user-plane node of a correspondence relationship between the set radio bearer and the data flow.

Particularly, if the access network node is separate from the access network user-plane node, then the access network node will notify the access network user-plane node of the correspondence relationship between the DRB and the data flow, and for example, a data flow satisfying a specific characteristic shall be mapped onto a DRB with the index of 1.

After the transmission-related configuration is set up, for a subsequent data flow, the access network user-plane node maps the received data correctly according to the configured mapping relationship between the data flow and the DRB so that the corresponding data flow can be mapped onto the corresponding DRB, and transmitted with a guaranteed quality of transmission.

In an implementation, when the quality of service parameter includes the characteristic of a special data packet, the access network node can further identify a data packet in the data flow according to the characteristic of a special data packet, and/or a data packet processing rule preset on the access network node, and process the identified data packet according to a requirement on the data packet.

Particularly for some special data packet in the data flow, a header or a payload of a data packet can be parsed using a method configured by the core network for identifying a special data packet, or a method configured by the access network for identifying a special data packet, and once it is identified as a special data packet, it can be processed specially, and for example, a transmission priority thereof can be improved. In a typical application, bonus data in WeChat can be processed at a high priority to thereby avoid congestion. The priority can be improved by mapping the special data packet directly onto a DRB with a higher priority, and the other qualities of services no lower than those of the original DRB; or by mapping the special data packet onto the original DRB, but processing the data packet at a high priority, for example, inserting the data packet at the front of a queue, or adding a special tag thereto.

Second Embodiment this embodiment relates to a radio bearer setup procedure based upon signaling in a data packet, and in this embodiment, the quality of service parameter is passed to the access network node by carrying the quality of service parameter in a data packet to be transmitted to the access network node, and then transmitting the data packet to the access network node.

In this embodiment, the core network does not perform a control-plane setup procedure for each data flow, but determines a level of service for a data packet according to information in the data packet in some preconfigured or negotiated manner. By way of an example, some correspondence relationship between the quality of service, and the value of a field in the data packet; and in a table, for example, the value 1 of a Flow Type field in the data packet represents traffic at a priority of 1, a transmission block error ratio of 10-6, and a transmission delay requirement of 100 ms; the value 2 of the Flow Type field represents traffic at a priority of 1, a transmission block error ratio of 10-6, and a transmission delay requirement of 300 ms; and so on. Even information about a rate can be included in the mapping. This mapping relationship can be specified in a standard, or can be configured in a procedure of some common signaling.

In an implementation, when the quality of service parameter is carried in the data packet to be transmitted to the access network node, and then the data packet is passed to the access network node, the radio bearer can be processed according to the quality of service parameter as follows: the existing radio bearers between the access network and the UE are searched for a radio bearer satisfying the quality of service parameter requirement, and after the radio bearer satisfying the quality of service parameter requirement is found as a result of the search, the data packet transmitted by the core network control entity is transmitted to the UE on the radio bearer; or the existing radio bearers between the access network and the UE are searched for a radio bearer satisfying the quality of service parameter requirement, and after no radio bearer satisfying the quality of service parameter requirement is found as a result of the search, a radio bearer satisfying the quality of service parameter requirement is set up, and the data packet transmitted by the core network control entity is transmitted to the UE on the radio bearer.

Particularly, when the data packet arrives, the access network node receives the data packet, reads a corresponding field in the data packet, obtains the Flow Type field above, and obtains quality of service information from the Flow Type field as preconfigured or prescribed, and if there is already an existing radio bearer for transmitting traffic with this quality, then the access network node will transmit the data packet directly onto the radio bearer for transmission; and if there is no corresponding radio bearer, then the access network node will set up a new radio bearer for the data packet, configure various L1 and L2 options for the new radio bearer according to the quality of service, and transmit the data packet onto the radio bearer for transmission after setting up the radio bearer. Stated otherwise, the radio bearer can be set up, and the data packet transmitted by the core network control entity can be transmitted to the UE on the radio bearer, as follows: a new radio bearer is set up, L1 and L2 options are configured according to the quality of service parameter requirement, and the data packet transmitted by the core network control entity is transmitted to the UE on the radio bearer after the radio bearer is configured.

In an implementation, if the access network node is separate from the access network user-plane node, then the data packet transmitted by the core network control entity to the access network user-plane node will be transmitted to the UE on the radio bearer after the radio bearer is set up.

Particularly, the access network user-plane node and the access network control-plane node are the same node as described above, for example, and if they are separate from each other, then the user-plane node will receive the data packet; and if there is no corresponding bearer, then the user-plane node will instruct the control-plane node to set up a corresponding radio bearer.

In an implementation, the access network node can further release a set radio bearer according to a set timer. Particularly the access network can set a related timer, and for a radio bearer on which no data have been transmitted for a long period of time, the access network can release the radio bearer.

Third Embodiment a radio bearer modification procedure will be described in this embodiment. In this example, the existing radio bearers between the access network and the UE are searched for radio bearers which can satisfy the quality of service parameter requirement, some radio bearer among the radio bearers which can satisfy the quality of service parameter requirement is reconfigured in a radio bearer reconfiguration flow to satisfy the quality of service parameter requirement, and then the data flow to be transmitted by the core network control entity to the UE is transmitted on the radio bearer. For example, the existing radio bearers between the access network and the UE are searched for radio bearers which can satisfy the quality of service parameter requirement, and if no radio bearer satisfying the quality of service parameter requirement is found as a result of the search, then some of radio bearers which can satisfy the quality of service parameter requirement among the existing radio bearers will be reconfigured in the radio bearer reconfiguration flow to satisfy the quality of service parameter requirement, and then the data flow to be transmitted by the core network control entity to the UE will be transmitted on the radio bearer.

Particularly for the core network, it always initiates a setup procedure to the access network upon arrival of a new data packet. Reference can be made to the first embodiment for a requesting procedure.

For the access network, if it determines that there is already a corresponding radio bearer on which the data flow can be transmitted, upon reception of a setup request of the core network, then no radio bearer will be newly set up at this time, but the radio bearer will simply be modified appropriately as needed. The radio bearer can be modified as follows:

when there is a rate requirement for the new data flow, at this time the new rate requirement shall be reflected onto the radio bearer, and for example, a new rate increment may be added to the original rate to obtain a resulting new rate, and the new rate requirement shall be configured to the corresponding radio bearer. Generally as the rate is varying, simply the access network node will update an internal record to affect subsequent scheduling and other operations, without notifying the UE;

if there is a new data flow joining so that configuration parameters of the original radio bearer change, then new configuration parameters will be notified to the UE; and attributes of the data flow shall be bound with the ID of the radio bearer, and subsequently a data flow with these attributes will be transmitted on the radio bearer.

If the UE is to be notified, then the radio bearer of the UE may be reconfigured, for example, in an RRC Reconfigure message, and after the radio bearer is reconfigured, the access network node return such information to the core network control node that transmission of the data flow is set up. Subsequently the data flow can be transmitted normally.

Alike when the core network notifies the access network node that there is an end of an existing data flow, the access network receives the signaling, searches for a radio bearer corresponding to the data flow, and removes the data flow from the radio bearer; and for example, it substrates a rate requirement of the data flow from a rate corresponding to the radio bearer, and removes attributes of the ended data flow from attributes of data transmitted on the radio bearer, and possibly modifies other configuration options. If there are still data on the corresponding radio bearer after the data flow is removed, then the radio bearer will be reserved, a radio bearer reconfiguration procedure will be initiated as needed, and a data flow end acknowledgment message will be returned to the core network after the radio bearer is reconfigured.

Alike when the core network notifies the access network node that an existing data flow shall be updated, for example, a quality of service thereof is changed, the access network receives the signaling, searches for a radio bearer corresponding to the data flow, and decides whether to reconfigure the radio bearer, according to the information change, and if a reconfiguration procedure shall be performed, then the access network will return a data flow update completion message to the core network after reconfiguring the radio bearer.

Fourth Embodiment a radio bearer releasing procedure will be described in this embodiment. In this example, a set radio bearer is released according to a set timer; and/or a set radio bearer is released upon reception of such a notification of the core network control entity that transmission of a data flow ends.

Particularly, when the core network notifies the access network node that an existing data flow ends, the access network receives the signaling, and searches for a radio bearer corresponding to the data flow, and if there are not any other data to be borne, after the data flow is removed from the radio bearer, then the access network may release the radio bearer. A releasing procedure can be as follows:

1. The access network node instructs the UE to release the radio bearer; and
2. The access network node receives completion signaling returned by the UE.

Thereafter the access network node can return data flow end completion signaling to the core network control entity.

In an implementation, when the radio bearer is also the last radio bearer of the UE, it indicates that all the data of the UE have ended, and at this time, an RRC connection of the UE can be released directly in a similar procedure to the procedure above.

Moreover instead of triggering by the core network control entity a radio bearer to be released, the core network control entity can alternatively set a timer for a radio bearer, and if there are not any data transmitted on the data bearer until the timer expires, then the radio bearer will be triggered to be released. The access network node will instruct the UE to release the bearer, and also notify the core network control entity.

Fifth Embodiment an uplink radio bearer managing procedure will be described in this embodiment.

Generally, a radio bearer is bidirectional, that is, it can operate in both an uplink direction and a corresponding downlink direction. For the downlink direction of the radio bearer, a parameter configuration, rate guaranteeing, a mapping pattern of a data flow to the radio bearer, etc., thereof are enforced by the access network node. For the uplink direction of the radio bearer, a parameter configuration is determined by the access network node, and enforced by the UE, rate guaranteeing necessitates both scheduling by the access network node, and some priority strategy to be enforced in the UE, and a mapping pattern of a data flow to the radio bearer is configured by the access network node, but this mapping operation is performed by the UE.

Accordingly, for an uplink radio bearer, after it is set up, the access network node shall notify the UE of the related parameter configuration, the rate parameter of the uplink radio bearer, and the mapping pattern to the uplink radio bearer.

If a corresponding uplink bearer is set up in cooperation for downlink data, then the uplink bearer will be set up and maintained accordingly as a downlink data flow is arriving, updated, and ending, and a particular procedure thereof will be the same as that in the previous embodiment except that when a downlink radio bearer is set up, modified, and released in the previous embodiment, corresponding operations will also be performed on an uplink radio bearer thereof. Particularly, the downlink radio bearer may only be configured with transmission parameters, and a rate parameter, and a mapping pattern of a data flow to the radio bearer may not be known to the UE, and thus may not configured to the UE; and for the uplink radio bearer, a rate parameter, and a mapping pattern of a data flow to the radio bearer shall be configured in addition to transmission parameters for which the UE shall operate in cooperation. The mapping pattern will be the same as that in the previous downlink implementation in which special data are processed. Stated otherwise, in an implementation, when the data flow to be transmitted between the core network and the UE includes an uplink data flow, the procedure can further include:

when an uplink radio bearer for transmitting uplink data is set up or reconfigured, the access network node notifies the UE of respective related parameters of the uplink radio bearer, and a mapping pattern of the uplink data flow to the uplink radio bearer.

If there is another uplink-triggered new data flow than an uplink data packet corresponding to downlink data, then such a new data flow will typically arrive as follows: the UE firstly notifies the core network that there are new data arriving, and of attributes of the new data, in a Non Access Stratum (NAS) procedure, and then the core network will decide on a quality of service for transmitting the data, and initiate a transport layer setup procedure corresponding to the uplink data flow to the access network node.

The core network notifies the access network node of the uplink data flow in the similar transport layer setup and maintenance procedure to that in the previous downlink flow except that the uplink radio bearer shall be configured with a rate parameter, and a mapping pattern of the data flow to the radio bearer in addition to transmission parameters for which the UE shall operate in cooperation.

After the uplink radio bearer is set up, the corresponding uplink data are mapped by the UE onto the corresponding radio bearer according to the attributes of the data packet. For example, if related fields in a header of the data packet, and their combination satisfy the configured requirement, then it will be mapped onto the specified uplink radio bearer, or a payload of the data packet may be parsed in some way, and a special data packet may be processed specially by improving the priority thereof, etc.

In an implementation, the access network node can notify the UE via RRC signaling.

Particularly, a signaling procedure between the access network node and the UE is generally an RRC signaling procedure.

Based upon the same inventive idea, embodiments of the invention further provide apparatuses for processing a radio bearer for transmitting a data flow, and since the apparatuses address the problem under a similar principle to the methods for processing a radio bearer for transmitting a data flow, reference can be made to the implementations of the methods for implementations of the apparatuses, and a repeated description thereof will be omitted here.

Figure 7:
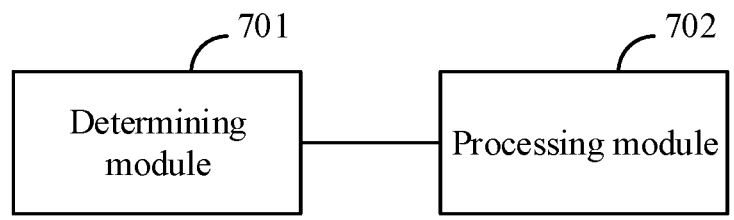
FIG. 7 is a schematic structural diagram of an apparatus for processing a radio bearer for transmitting a data flow at the access network node side according to an embodiment of the invention.

FIG. 7 is a schematic structural diagram of an apparatus for processing a radio bearer for transmitting a data flow at the access network node, and as illustrated, the apparatus can include:

a determining module 701 is configured to determine a quality of service parameter passed by a core network control entity to an access network node; and a processing module 702 is to process a radio bearer according to the quality of service parameter to transmit a data flow to be transmitted between a core network and a UE.

In an implementation, the determining module is further configured to determine the quality of service parameter according to the quality of service parameter passed by the core network control entity to the access network node in a signaling-plane message; or to determine the quality of service parameter according to the quality of service parameter carried in a data packet transmitted to the access network node.

In an implementation, the processing module configured to process the radio bearer according to the quality of service parameter when the quality of service parameter is passed to the access network node in the signaling-plane message is further configured:

to search existing radio bearers between an access network and the UE for a radio bearer satisfying the quality of service parameter, and after the radio bearer satisfying the quality of service parameter is found as a result of the search, to transmit the data flow to be transmitted by the core network control entity to the UE, on the radio bearer; or to search existing radio bearers between an access network and the UE for a radio bearer satisfying the quality of service parameter, and after no radio bearer satisfying the quality of service parameter is found as a result of the search, to determine whether a radio bearer satisfying the quality of service parameter can be set up, according to a resource of the access network, and if so, to set up the radio bearer, and to transmit the data flow to be transmitted by the core network control entity to the UE, on the radio bearer; or to search existing radio bearers between an access network and the UE for radio bearers satisfying the quality of service parameter, and to reconfigure some radio bearer among the radio bearers which can satisfy the quality of service parameter requirement, in a radio bearer reconfiguration flow to satisfy the quality of service parameter requirement, and then transmit the data flow to be transmitted by the core network control entity to the UE, on the radio bearer.

In an implementation, the processing module configured to determine whether a radio bearer satisfying the quality of service parameter can be set up, according to the resource of the access network is further configured to determine whether a radio bearer satisfying the quality of service parameter can be set up, according to whether the resource of the access network can satisfy a bit rate requirement for the data flow.

In an implementation, the processing module configured to set up the radio bearer is further configured to return a message, acknowledging that the bearer is set up, which responds to the signaling-plane message to the core network after setting up the radio bearer with the UE according to the quality of service parameter requirement.

In an implementation, the quality of service parameter includes one or a combination of the following information:
a quality of service requirement for the data flow, a transmission attribute of the data flow, and a characteristic of a special data packet.

In an implementation, the processing module is further configured, when the quality of service parameter includes the characteristic of a special data packet, to identify a data packet in the data flow according to the characteristic of a special data packet, and/or a data packet processing rule preset on the access network node, and to process the identified data packet according to a requirement on the data packet.

In an implementation, the processing module configured to process the radio bearer according to the quality of service parameter when the quality of service parameter is carried in the data packet to be transmitted to the access network node, and then passed to the access network node is further configured:

to search existing radio bearers between an access network and the UE for a radio bearer satisfying the quality of service parameter requirement, and after the radio bearer satisfying the quality of service parameter requirement is found as a result of the search, to transmit the data packet transmitted by the core network control entity, to the UE on the radio bearer; or to search existing radio bearers between an access network and the UE for a radio bearer satisfying the quality of service parameter requirement, and after no radio bearer satisfying the quality of service parameter requirement is found as a result of the search, to set up a radio bearer satisfying the quality of service parameter requirement, and to transmit the data packet transmitted by the core network control entity, to the UE on the radio bearer.

In an implementation, the processing module configured to set up the radio bearer, and to transmit the data packet transmitted by the core network control entity, to the UE on the radio bearer is further configured: to set up a new radio bearer, to configure various L1 and L2 options according to the quality of service parameter requirement, and to transmit the data packet transmitted by the core network control entity, to the UE on the radio bearer after the radio bearer is configured.

In an implementation, the processing module is further configured: to release a set radio bearer according to a set timer; and/or release a set radio bearer upon reception of such a notification of the core network control entity that transmission of a data flow ends.

In an implementation, the processing module configured to set up an uplink radio bearer for transmitting uplink data when the data flow to be transmitted between the core network and the UE includes an uplink data flow is further configured to notify the UE of related parameters of the uplink radio bearer, and a mapping relationship between the uplink data flow and the uplink radio bearer.

In an implementation, the processing module is further configured to notify the UE via RRC signaling.

Figure 8:
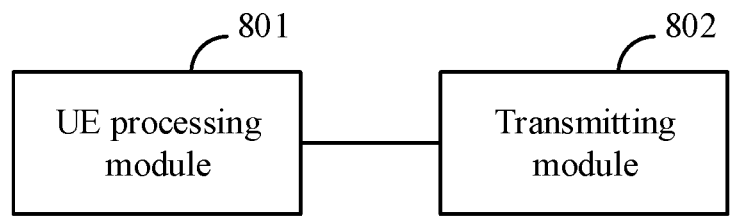
FIG. 8 is a schematic structural diagram of an apparatus for processing a radio bearer for transmitting a data flow at the UE side according to an embodiment of the invention.

FIG. 8 is a schematic structural diagram of an apparatus for processing a radio bearer for transmitting a data flow at the UE side, and as illustrated, the apparatus can include:
- a UE processing module 801 is configured to process a radio bearer on a UE according to a requirement of an access network node, where the requirement of the access network node is made by the access network node according to a quality of service parameter passed by a core network control entity to the access network node; and
- a transmitting module 802 is configured to transmit a data flow to be transmitted between a core network and the UE, on the radio bearer.

In an implementation, the UE processing module is further configured to determine an uplink data flow to be transmitted by the UE, and to notify the core network control entity, when the data flow to be transmitted between the core network and the UE includes an uplink data flow.

In an implementation, the UE processing module is further configured to notify the core network control entity of the transmission requirement via NAS signaling.

In an implementation, the UE processing module is further configured to receive a notification including respective related parameters of an uplink radio bearer for transmitting an uplink data flow, and a mapping relationship between the uplink data flow and the uplink radio bearer.

In an implementation, the UE processing module is further configured to receive the notification via RRC signaling.

For the sake of a convenient description, the respective components of the apparatuses above have been described in function respectively as respective modules and units. Of course, the functions of the respective modules or units can be performed in the same one or more pieces of software or hardware in an implementation of the invention.

The technical solutions according to the embodiments of the invention can be implemented as follows.

Figure 9:
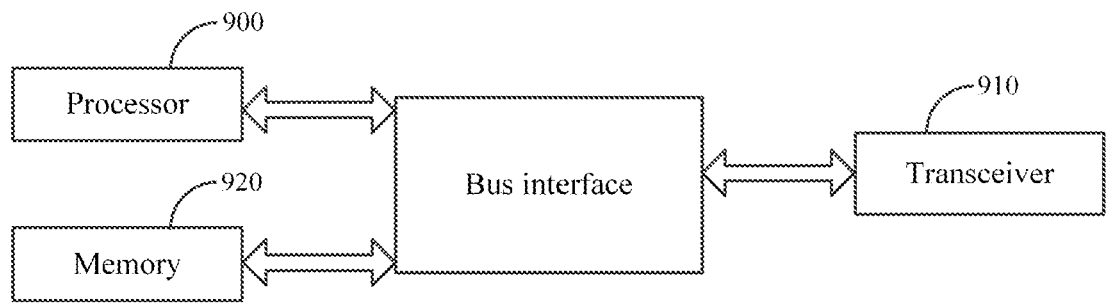
FIG. 9 is a schematic structural diagram of an access network node according to an embodiment of the invention.

FIG. 9 is a schematic structural diagram of an access network node according to an embodiment of the invention, and as illustrated, the access network node includes:
- a processor 900 is configured to read and execute program in a memory 920:
  to determine a quality of service parameter passed by a core network control entity to an access network node; and
- a transceiver 910 is configured to receive and transmit data under the control of the processor 900:
  to process a radio bearer according to the quality of service parameter to transmit a data flow to be transmitted between a core network and a UE.

In an implementation, the quality of service parameter passed to the access network node is passed by passing the quality of service parameter to the access network node in a signaling-plane message; or
the quality of service parameter passed to the access network node is passed by carrying the quality of service parameter in a data packet transmitted to the access network node, and then passing the data packet to the access network node.

In an implementation, processing the radio bearer according to the quality of service parameter when the quality of service parameter is passed to the access network node in the signaling-plane message includes:
searching existing radio bearers between an access network and the UE for a radio bearer satisfying the quality of service parameter, and after the radio bearer satisfying the quality of service parameter is found as a result of the search, transmitting the data flow to be transmitted by the core network control entity to the UE, on the radio bearer; or
searching existing radio bearers between an access network and the UE for a radio bearer satisfying the quality of service parameter, and after no radio bearer satisfying the quality of service parameter is found as a result of the search, determining whether a radio bearer satisfying the quality of service parameter can be set up, according to a resource of the access network, and if so, then setting up the radio bearer, and transmitting the data flow to be transmitted by the core network control entity to the UE, on the radio bearer; or
searching existing radio bearers between an access network and the UE for radio bearers satisfying the quality of service parameter, and reconfiguring some radio bearer among the radio bearers which can satisfy the quality of service parameter requirement, in a radio bearer reconfiguration flow to satisfy the quality of service parameter requirement, and then transmitting the data flow to be transmitted by the core network control entity to the UE, on the radio bearer.

In an implementation, determining whether a radio bearer satisfying the quality of service parameter can be set up, according to the resource of the access network includes determining whether a radio bearer satisfying the quality of service parameter can be set up, according to whether the resource of the access network can satisfy a bit rate requirement for the data flow.

In an implementation, setting up the radio bearer includes:
returning a message, acknowledging that the bearer is set up, which responds to the signaling-plane message to the core network after setting up the radio bearer with the UE according to the quality of service parameter requirement.

In an implementation, the quality of service parameter includes one or a combination of the following information:
a quality of service requirement for the data flow, a transmission attribute of the data flow, and a characteristic of a special data packet.

In an implementation, when the quality of service parameter includes the characteristic of a special data packet, the process further includes:

identifying a data packet in the data flow according to the characteristic of a special data packet, and/or a data packet processing rule preset on the access network node; and processing the identified data packet according to a requirement on the data packet.

In an implementation, processing the radio bearer according to the quality of service parameter when the quality of service parameter is carried in the data packet to be transmitted to the access network node, and then passed to the access network node includes:

searching existing radio bearers between an access network and the UE for a radio bearer satisfying the quality of service parameter requirement, and after the radio bearer satisfying the quality of service parameter requirement is found as a result of the search, transmitting the data packet transmitted by the core network control entity, to the UE on the radio bearer; or searching existing radio bearers between an access network and the UE for a radio bearer satisfying the quality of service parameter requirement, and after no radio bearer satisfying the quality of service parameter requirement is found as a result of the search, setting up a radio bearer satisfying the quality of service parameter requirement, and transmitting the data packet transmitted by the core network control entity, to the UE on the radio bearer.

In an implementation, setting up the radio bearer, and transmitting the data packet transmitted by the core network control entity, to the UE on the radio bearer includes:

setting up a new radio bearer, configuring various L1 and L2 options according to the quality of service parameter requirement, and transmitting the data packet transmitted by the core network control entity, to the UE on the radio bearer after the radio bearer is configured.

In an implementation, the processer is further configured to:

release a set radio bearer according to a set timer; and/or release a set radio bearer upon reception of such a notification of the core network control entity that transmission of a data flow ends.

In an implementation, when the data flow to be transmitted between the core network and the UE includes an uplink data flow, the process further includes:

when an uplink radio bearer for transmitting uplink data is set up or reconfigured, notifying, by the access network node, the UE of related parameters of the uplink radio bearer, and a mapping relationship between the uplink data flow and the uplink radio bearer.

In an implementation, the access network node notifies the UE via RRC signaling.

Here in FIG. 9, the bus architecture can include any number of interconnecting buses and bridges to particularly link together various circuits including one or more processors represented by the processor 900, and one or more memories represented by the memory 920. The bus architecture can further link together various other circuits, e.g., a peripheral device, a manostat, a power management circuit, etc., all of which are well known in the art, so a further description thereof will be omitted in this context. The bus interface serves as an interface. The transceiver 910 can be a number of elements, e.g., a transmitter and a receiver, which are units for communication with various other devices on a transmission medium. The processor 900 is responsible for managing the bus architecture and performing normal processes, and the memory 920 can store data for use by the processor 900 in performing the operations.

Figure 10:
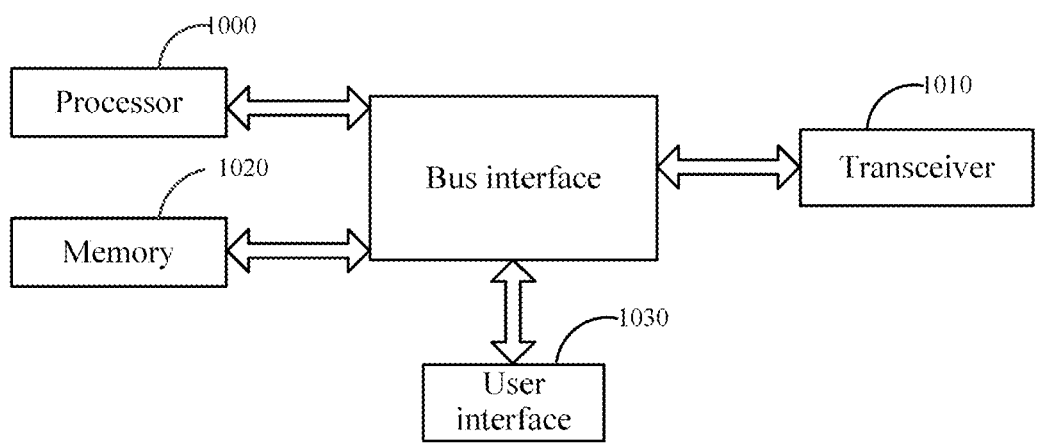
FIG. 10 is a schematic structural diagram of a UE according to an embodiment of the invention.

FIG. 10 is a schematic structural diagram of a UE according to an embodiment of the invention, and as illustrated, the UE includes:

a processor 1000 is configured to read and execute program in a memory 1020:

to process a radio bearer on the UE according to a requirement of an access network node, where the requirement of the access network node is made by the access network node according to a quality of service parameter passed by a core network control entity to the access network node; and a transceiver 1010 is configured to receive and transmit data under the control of the processor 1000:

to transmit a data flow to be transmitted between a core network and the UE, on the radio bearer.

In an implementation, when the data flow to be transmitted between the core network and the UE includes an uplink data flow, the process further includes:

determining an uplink data flow to be transmitted by the UE, and notifying the core network control entity.

In an implementation, the core network control entity is notified of the transmission requirement via NAS signaling.

In an implementation, the processer is further configure to:

receive a notification including respective related parameters of an uplink radio bearer for transmitting an uplink data flow, and a mapping relationship between the uplink data flow and the uplink radio bearer.

In an implementation, the notification is transmitted via RRC signaling.

Here in FIG. 10, the bus architecture can include any number of interconnecting buses and bridges to particularly link together various circuits including one or more processors represented by the processor 1000, and one or more memories represented by the memory 1020. The bus architecture can further link together various other circuits, e.g., a peripheral device, a manostat, a power management circuit, etc., all of which are well known in the art, so a further description thereof will be omitted in this context. The bus interface serves as an interface. The transceiver 1010 can be a number of elements, e.g., a transmitter and a receiver, which are units for communication with various other devices on a transmission medium. For different user equipments, the user interface 1030 can also be an interface via which devices are connected internally and externally as needed, and the connected devices include but will not be limited to a keypad, a monitor, a speaker, a microphone, a joystick, etc.

The processor 1000 is responsible for managing the bus architecture and performing normal processes, and the memory 1020 can store data for use by the processor 1000 in performing the operations.

In summary, in the technical solutions according to the embodiments of the invention, the access network node obtains the quality of service parameters of the data flow according to the configuration of the core network, or the attributes of the data flow of the core network, and decides on the most appropriate air interface radio bearer for the data flow according to the quality of service parameters, and if there is no radio bearer on the air interface, which satisfies the quality requirement, then the access network node will set up a new radio bearer for the data flow; and if there is an existing radio bearer on the air interface, which satisfies the quality of service requirement, then the access network node will map the data flow onto the radio bearer, and reconfigure the radio bearer, or update the parameters thereof, as needed. Particularly including:

the access network side performs a procedure of setting up, modifying, and releasing the radio bearer for the data flow; manages the radio bearer based upon the signaling in the data packet; decides on mapping of the data flow to the radio bearer; processes a special data packet in the data flow; and configures the UE with a mapping pattern of data onto an uplink bearer through the access network node via RRC signaling.

Based upon the same inventive idea, an embodiment of the invention provides a computer storage medium storing computer executable instructions configured to cause the computer to perform any one of the embodiments of the method above performed by the access network node.

Based upon the same inventive idea, an embodiment of the invention provides a computer storage medium storing computer executable instructions configured to cause the computer to perform any one of the embodiments of the method above performed by the user equipment.

With these solutions, a plurality of data flows with the same quality of service can be mapped in effect onto a radio bearer to thereby lower the complexity of a signaling procedure, guarantee the quality of traffic transmission, and support processing of a special data packet.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for processing a radio bearer for transmitting a data flow, the method comprising:

determining a quality of service parameter passed by a core network control entity to an access network node; and processing a radio bearer according to the quality of service parameter to transmit a data flow to be transmitted between a core network and a User Equipment (UE);

wherein the quality of service parameter is passed to the access network node in a signaling-plane message; or the quality of service parameter is passed to the access network node by carrying the quality of service parameter in a data packet transmitted to the access network node;

wherein processing the radio bearer according to the quality of service parameter when the quality of service parameter is passed to the access network node in the signaling-plane message comprises:

searching existing radio bearers between an access network and the UE for a radio bearer satisfying the quality of service parameter requirement, and after no radio bearer satisfying the quality of service parameter requirement is found as a result of the search, determining whether a radio bearer satisfying the quality of service parameter can be set up, according to whether the resource of the access network can satisfy a bit rate requirement for the data flow, and if so, setting up a radio bearer satisfying the quality of service parameter requirement, and transmitting the data flow to be transmitted by the core network control entity to the UE, on the set radio bearer; or searching existing radio bearers between an access network and the UE for radio bearers satisfying the quality of service parameter, and reconfiguring some radio bearer among the radio bearers which can satisfy the quality of service parameter requirement, in a radio bearer reconfiguration flow to satisfy the quality of service parameter requirement, and transmitting the data flow to be transmitted by the core network control entity to the UE, on the radio bearer;

wherein processing the radio bearer according to the quality of service parameter when the quality of service parameter is passed to the access network node by carrying the quality of service parameter in the data packet to be transmitted to the access network node, comprises:

searching existing radio bearers between an access network and the UE for a radio bearer satisfying the quality of service parameter requirement, and after the radio bearer satisfying the quality of service parameter requirement is found as a result of the search, transmitting the data packet transmitted by the core network control entity, to the UE on the found radio bearer; or searching existing radio bearers between an access network and the UE for a radio bearer satisfying the quality of service parameter requirement, and after no radio bearer satisfying the quality of service parameter requirement is found as a result of the search, setting up a new radio bearer, configuring various layer 1 (L1) and layer 2 (L2) options for the new radio bearer according to the quality of service parameter requirement, and transmitting the data packet transmitted by the core network control entity, to the UE on the radio bearer after the radio bearer is configured.

2. The method according to claim 1, further comprises at least one of:
releasing a set radio bearer according to a set timer; or
releasing a set radio bearer upon reception of a notification of the core network control entity which notifies that transmission of a data flow is finished.

3. The method according to claim 1, wherein when the data flow to be transmitted between the core network and the UE comprises an uplink data flow, the method further comprises:
when an uplink radio bearer for transmitting uplink data is set up or reconfigured, notifying, by the access network node, the UE of related parameters of the uplink radio bearer, and a mapping relationship between the uplink data flow and the uplink radio bearer.

4. The method according to claim 1, wherein the quality of service parameter comprises one or a combination of following information:
a quality of service requirement for the data flow, a transmission attribute of the data flow, and a characteristic of a special data packet.

5. The method according to claim 4, wherein when the quality of service parameter comprises the characteristic of a special data packet, the method further comprises:
identifying a data packet in the data flow according to the characteristic of at least one of a special data packet, or a data packet processing rule preset on the access network node, and
processing the identified data packet according to a requirement on the data packet.

6. A method for processing a radio bearer for transmitting a data flow, the method comprising:
processing a radio bearer on a User Equipment (UE) according to a requirement of an access network node, wherein the requirement of the access network node is made by the access network node according to a quality of service parameter passed by a core network control entity to the access network node; and
transmitting a data flow to be transmitted between a core network and the UE, on the radio bearer;
wherein processing the radio bearer on the UE according to the requirement of the access network node comprises:
when the quality of service parameter is passed to the access network node in a signaling-plane message,
searching existing radio bearers between an access network and the UE for a radio bearer satisfying the quality of service parameter requirement, and after no radio bearer satisfying the quality of service parameter requirement is found as a result of the search, determining whether a radio bearer satisfying the quality of service parameter can be set up, according to whether the resource of the access network can satisfy a bit rate requirement for the data flow, and if so, setting up a radio bearer satisfying the quality of service parameter requirement, and transmitting the data flow to be transmitted by the core network control entity to the UE, on the set radio bearer; or
searching existing radio bearers between an access network and the UE for radio bearers satisfying the quality of service parameter, and reconfiguring some radio bearer among the radio bearers which can satisfy the quality of service parameter requirement, in a radio bearer reconfiguration flow to satisfy the quality of service parameter requirement, and transmitting the data flow to be transmitted by the core network control entity to the UE, on the radio bearer;
when the quality of service parameter is passed to the access network node by carrying the quality of service parameter in a data packet to be transmitted to the access network node,
searching existing radio bearers between an access network and the UE for a radio bearer satisfying the quality of service parameter requirement, and after the radio bearer satisfying the quality of service parameter requirement is found as a result of the search, transmitting the data packet transmitted by the core network control entity, to the UE on the found radio bearer; or
searching existing radio bearers between an access network and the UE for a radio bearer satisfying the quality of service parameter requirement, and after no radio bearer satisfying the quality of service parameter requirement is found as a result of the search, setting up a new radio bearer, configuring various layer 1 (L1) and layer 2 (L2) options for the new radio bearer according to the quality of service parameter requirement, and transmitting the data packet transmitted by the core network control entity, to the UE on the radio bearer after the radio bearer is configured.

7. The method according to claim 6, wherein when the data flow to be transmitted between the core network and the UE comprises an uplink data flow, the method further comprises:
determining an uplink data flow to be transmitted by the UE, and notifying the core network control entity.

8. The method according to claim 6, further comprises:
receiving a notification comprising respective related parameters of an uplink radio bearer for transmitting an uplink data flow, and a mapping relationship between the uplink data flow and the uplink radio bearer.

9. An access network node device, comprising: a processor, a memory, and a transceiver, wherein the transceiver is configured to receive and transmit data under the control of the processor, preset program is stored in the memory, and the processor is configured to read the program in the memory to:
determine a quality of service parameter passed by a core network control entity to an access network node; and
process a radio bearer according to the quality of service parameter to transmit a data flow to be transmitted between a core network and a User Equipment (UE);
wherein the processor is configured to read the program in the memory
to determine the quality of service parameter according to the quality of service parameter passed by the core network control entity to the access network node in a signaling-plane message; or
to determine the quality of service parameter according to the quality of service parameter carried in a data packet transmitted to the access network node;
wherein when the quality of service parameter is passed to the access network node in the signaling-plane message, the processor is further configured to read the program in the memory to:

search existing radio bearers between an access network and the UE for a radio bearer satisfying the quality of service parameter requirement, and after no radio bearer satisfying the quality of service parameter is found as a result of the search, to determine whether a radio bearer satisfying the quality of service parameter can be set up, according to whether the resource of the access network can satisfy a bit rate requirement for the data flow, and if so, to set up a radio bearer satisfying the quality of service parameter requirement, and to transmit the data flow to be transmitted by the core network control entity to the UE, on the set radio bearer; or search existing radio bearers between an access network and the UE for radio bearers satisfying the quality of service parameter, and to reconfigure some radio bearer among the radio bearers which can satisfy the quality of service parameter requirement, in a radio bearer reconfiguration flow to satisfy the quality of service parameter requirement, and transmit the data flow to be transmitted by the core network control entity to the UE, on the radio bearer;

wherein when the quality of service parameter is passed to the access network node by carrying the quality of service parameter in the data packet to be transmitted to the access network node, the processor is further configured to read the program in the memory to:

search existing radio bearers between an access network and the UE for a radio bearer satisfying the quality of service parameter requirement, and after the radio bearer satisfying the quality of service parameter requirement is found as a result of the search, to transmit the data packet transmitted by the core network control entity, to the UE on the found radio bearer; or search existing radio bearers between an access network and the UE for a radio bearer satisfying the quality of service parameter requirement, and after no radio bearer satisfying the quality of service parameter requirement is found as a result of the search, to set up a new radio bearer, configuring various layer 1 (L1) and layer 2 (L2) options for the new radio bearer according to the quality of service parameter requirement, and transmitting the data packet transmitted by the core network control entity, to the UE on the radio bearer after the radio bearer is configured.

10. A user equipment, comprising: a processor, a memory, and a transceiver, wherein the transceiver is configured to receive and transmit data under the control of the processor, preset program is stored in the memory, and the processor is configured to read the program in the memory to:

process a radio bearer on a User Equipment (UE) according to a requirement of an access network node, wherein the requirement of the access network node is made by the access network node according to a quality of service parameter passed by a core network control entity to the access network node; and transmit a data flow to be transmitted between a core network and the UE, on the radio bearer;

wherein the processor configured to read the program in the memory to process the radio bearer on the UE according to the requirement of the access network node, is further configured to:

when the quality of service parameter is passed to the access network node in a signaling-plane message, search existing radio bearers between an access network and the UE for a radio bearer satisfying the quality of service parameter requirement, and after no radio bearer satisfying the quality of service parameter requirement is found as a result of the search, determine whether a radio bearer satisfying the quality of service parameter can be set up, according to whether the resource of the access network can satisfy a bit rate requirement for the data flow, and if so, set up a radio bearer satisfying the quality of service parameter requirement, and transmit the data flow to be transmitted by the core network control entity to the UE, on the set radio bearer; or search existing radio bearers between an access network and the UE for radio bearers satisfying the quality of service parameter, and reconfigure some radio bearer among the radio bearers which can satisfy the quality of service parameter requirement, in a radio bearer reconfiguration flow to satisfy the quality of service parameter requirement, and transmit the data flow to be transmitted by the core network control entity to the UE, on the radio bearer;

when the quality of service parameter is passed to the access network node by carrying the quality of service parameter in a data packet to be transmitted to the access network node, search existing radio bearers between an access network and the UE for a radio bearer satisfying the quality of service parameter requirement, and after the radio bearer satisfying the quality of service parameter requirement is found as a result of the search, transmit the data packet transmitted by the core network control entity, to the UE on the found radio bearer; or search existing radio bearers between an access network and the UE for a radio bearer satisfying the quality of service parameter requirement, and after no radio bearer satisfying the quality of service parameter requirement is found as a result of the search, set up a new radio bearer, configure various layer 1 (L1) and layer 2 (L2) options for the new radio bearer according to the quality of service parameter requirement, and transmit the data packet transmitted by the core network control entity, to the UE on the radio bearer after the radio bearer is configured.

11. The access network node device according to claim 9, wherein the processor is configured to read the program in the memory to at least one of: release a set radio bearer according to a set timer; or release a set radio bearer upon reception of such a notification of the core network control entity that transmission of a data flow ends.

12. The access network node device according to claim 9, wherein the processor is configured to read the program in the memory to set up an uplink radio bearer for transmitting uplink data when the data flow to be transmitted between the core network and the UE comprises an uplink data flow by notifying the UE of related parameters of the uplink radio bearer, and a mapping relationship between the uplink data flow and the uplink radio bearer.

13. The access network node device according to claim 9, wherein the quality of service parameter comprises one or a combination of following information:

a quality of service requirement for the data flow, a transmission attribute of the data flow, and a characteristic of a special data packet.

14. The access network node device according to claim 13, wherein the processor is configured to read the program in the memory to, when the quality of service parameter comprises the characteristic of a special data packet, identify at least one of a data packet in the data flow according to the characteristic of a special data packet, or a data packet processing rule preset on the access network node, and process the identified data packet according to a requirement on the data packet.

15. The user equipment according to claim 10, wherein the processor is configured to read the program in the memory to determine an uplink data flow to be transmitted by the UE, and to notify the core network control entity, when the data flow to be transmitted between the core network and the UE comprises an uplink data flow.

16. The user equipment according to claim 10, wherein the processor is configured to read the program in the memory to receive a notification comprising respective related parameters of an uplink radio bearer for transmitting an uplink data flow, and a mapping relationship between the uplink data flow and the uplink radio bearer.

* * * * *